United States Patent [19]
Callihoo

[11] Patent Number: 5,483,828
[45] Date of Patent: Jan. 16, 1996

[54] SPEED INDICATOR FOR MARINE VEHICLES

[76] Inventor: Brian Callihoo, 9507-113 Street, Grand Prarie, Alberta, Canada, T8V 5L2

[21] Appl. No.: 213,091

[22] Filed: Mar. 15, 1994

[51] Int. Cl.$^6$ .................................................. G01C 21/00
[52] U.S. Cl. ........................................... 73/187; 73/178 R
[58] Field of Search ..................... 73/186, 187, 178 R, 73/861.78, 861.79, 861.85, 861.87, 861.88, 861.74

[56] References Cited

U.S. PATENT DOCUMENTS

| | | | |
|---|---|---|---|
| 3,706,224 | 11/1972 | Overs | 73/187 |
| 4,109,526 | 8/1978 | Rosso | 73/861.78 |
| 4,159,644 | 7/1979 | Svala | 73/187 |
| 4,507,960 | 4/1985 | Hufnagel et al. | 73/187 |
| 4,644,788 | 2/1987 | Boucher | 73/187 |
| 4,676,097 | 6/1987 | Tusting | 73/187 |
| 4,898,029 | 2/1990 | Boucher | 73/187 |
| 5,366,394 | 11/1994 | Kanno | 73/187 |
| 5,369,360 | 11/1994 | Amyot | 73/187 |

Primary Examiner—Richard Chilcot
Assistant Examiner—Elizabeth L. Dougherty
Attorney, Agent, or Firm—Baker & Daniels

[57] ABSTRACT

A speed indicator for marine vehicles is mounted on the lower transom area of such a vehicle and includes an impeller. The impeller rotates at an angular velocity dependant on the speed of marine vehicle relative to the water. A mounting bracket secures the speed indicator to the marine vehicle in a manner to permit movement of speed indicator relative to the marine vehicle so that the axis of the impeller remains generally in line with the direction of travel of the marine vehicle. To try to ensure laminar flow across the impeller and to facilitate movement of the speed indicator, the speed indicator has a guide vane positioned upstream of the impeller. The mounting bracket also permits adjustment of the speed indicator so that the axis of the impeller is basically parallel to the plane of the bottom of the marine vehicle. A sensor including a magnetic conductor and a magnetic pick-up detects rotation of the impeller and generates output representative of the speed of the marine vehicle. In one embodiment, the magnetic pick-up is supported by the speed indicator above the water level.

21 Claims, 4 Drawing Sheets

SPEED INDICATOR FOR MARINE VEHICLES

FIELD OF THE INVENTION

The present invention relates to speed indicators and in particular to a speed indicator for marine vehicles.

BACKGROUND OF THE INVENTION

Conventional speed indicators for marine vehicles rely on the Pitot principle and include a Pitot tube which projects from the marine vehicle. As the marine vehicle moves over the water surface, water impinges on the open end of the Pitot tube. This creates pressure within the Pitot tube having a magnitude dependant on the speed of the marine vehicle. The pressure created within the Pitot tube operates an analog gauge so that a visual indication of the speed of the marine vehicle is provided.

Unfortunately, speed indicators of this type suffer from disadvantages in that particles in the water such as algae and other debris may cause plugging in the Pitot tube. Plugging in the Pitot tube affects the pressure created therein resulting in inconsistent speed readings being displayed by the analog gauge.

Other types of speed indicators for marine vehicles have also been considered such as those described in U.S. Pat. No. 3,706,224 to Overs and U.S. Pat. No. 4,507,960 to Hufnagel et al. The Overs speed indicator includes a drag impeller mounted within an enclosure installed in the hull of a marine vehicle. The impeller rotates as the marine vehicle travels over the water. Magnets are attached to some of the vanes of the impeller and are detected by a sensor as the impeller rotates. The number of times the magnets are detected by the sensor within a given time frame, is used by a circuit to calculate the speed of the marine vehicle.

The Hufnagel et al speed indicator also includes an impeller within a mounting member received in a recess formed in the bottom of a marine vehicle. Some of the vanes of the impeller have permanent magnets attached to them which are detected by a Hall Effect sensor as the impeller rotates. The number of times the permanent magnets are detected by the sensor within a given time frame is used to determine the speed of the marine vehicle.

Although the Overs and Hufnagel et al speed indicators avoid the need for a Pitot tube, because the impellers in these speed indicators are located within housings, they are still susceptible to plugging which can cause inconsistencies in the speed readings given by the speed indicators. Also, because these designs require the impellers to carry permanent magnets, manufacturing costs become significant. Accordingly, there is a need for an improved speed indicator for marine vehicles.

It is therefore an object of the present invention to obviate or mitigate at least one of the above disadvantages by providing a novel speed indicator for marine vehicles.

SUMMARY OF THE INVENTION

According to one aspect of the present invention there is provided a speed indicator for a marine vehicle comprising:

mounting means to secure said indicator to said marine vehicle;

an impeller formed of magnetizable material and being rotatably mounted on said indicator, said impeller rotating at an angular velocity dependant on the speed of said marine vehicle; and magnetic sensing means to sense rotation of said impeller and provide an output representative of the speed of said marine vehicle.

Preferably, the magnetic sensing means includes a magnetic conductor disposed above the impeller and a magnetic pick-up associated with the magnetic conductor. Successive passes of the vanes on the impeller induce current in the magnetic conductor which are detected by the magnetic pick-up. The magnetic pick-up in turn generates; the output in response to the magnetic fluxes. It is also preferred that the impeller and magnetic sensing means are mounted on a support, the support being pivotal relative to the mounting means about an axis generally normal to the axis of the impeller.

Preferably, the support further includes guide means to assist pivoting of the support about the axis so that the axis of the impeller remains substantially in line with the direction of travel of the marine vehicle. It is also preferred that the guide means is configured to inhibit turbulent flow of water across the impeller anti is in the form of a guide vane.

Preferably, the mounting means permits the axis of the impeller to be positioned generally parallel to the plane of the bottom of the marine vehicle. In one embodiment, it is preferred that the support on which the sensing means and impeller are mounted, positions the magnetic pick-up above the water level while supporting the impeller so that it is totally submerged.

According to another aspect of the present invention there is provided a speed indicator for a marine vehicle comprising:

mounting means to secure said indicator to said marine vehicle;

an impeller rotatably mounted on said indicator and rotating at an angular velocity dependant on the speed of said marine vehicle; and sensing means to sense rotation of said impeller and provide an output representative of the speed of said marine vehicle, wherein said mounting means is selectively adjustable to allow the axis of said impeller to be positioned generally parallel to the plane of the bottom of said marine vehicle.

In still yet another aspect of the present invention there is provided a speed indicator for a marine vehicle comprising:

mounting means to secure said indicator to said marine vehicle;

an impeller rotatably mounted on said indicator and rotating at an angular velocity dependant on the speed of said marine vehicle;

sensing means to sense rotation of said impeller and provide an output representative of the speed of said marine vehicle; and a support for said impeller and said sensing means, said support being pivotal relative to the mounting means about an axis generally normal to the axis of said impeller.

In still yet another embodiment of the present invention there is provided a speed indicator for marine vehicles comprising:

mounting means to secure said indicator to said marine vehicle;

an impeller rotatably mounted on said indicator and rotating at an angular velocity dependant on the speed of said marine vehicle;

sensing means to sense rotation of said impeller and provide an output representative of the speed of said marine vehicle; and means to inhibit turbulent flow across said impeller.

The present invention provides advantages in that its design avoids the plugging problems associated with prior art speed indicators. The present speed indicator also provides accurate speed readings throughout the entire speed range of the marine vehicle by allowing the impeller to pivot so that its axis remains generally in line with the direction of travel of the marine vehicle and by ensuring laminar flow over the impeller.

BRIEF DESCRIPTION OF THE DRAWINGS

An embodiment of the present invention will now be described more fully with reference to the accompanying drawings in which:

FIG. 1 is an end view of the speed indicator illustrated in FIG. 1; and

DESCRIPTION OF THE PREFERRED EMBODIMENTS

Figure 1:
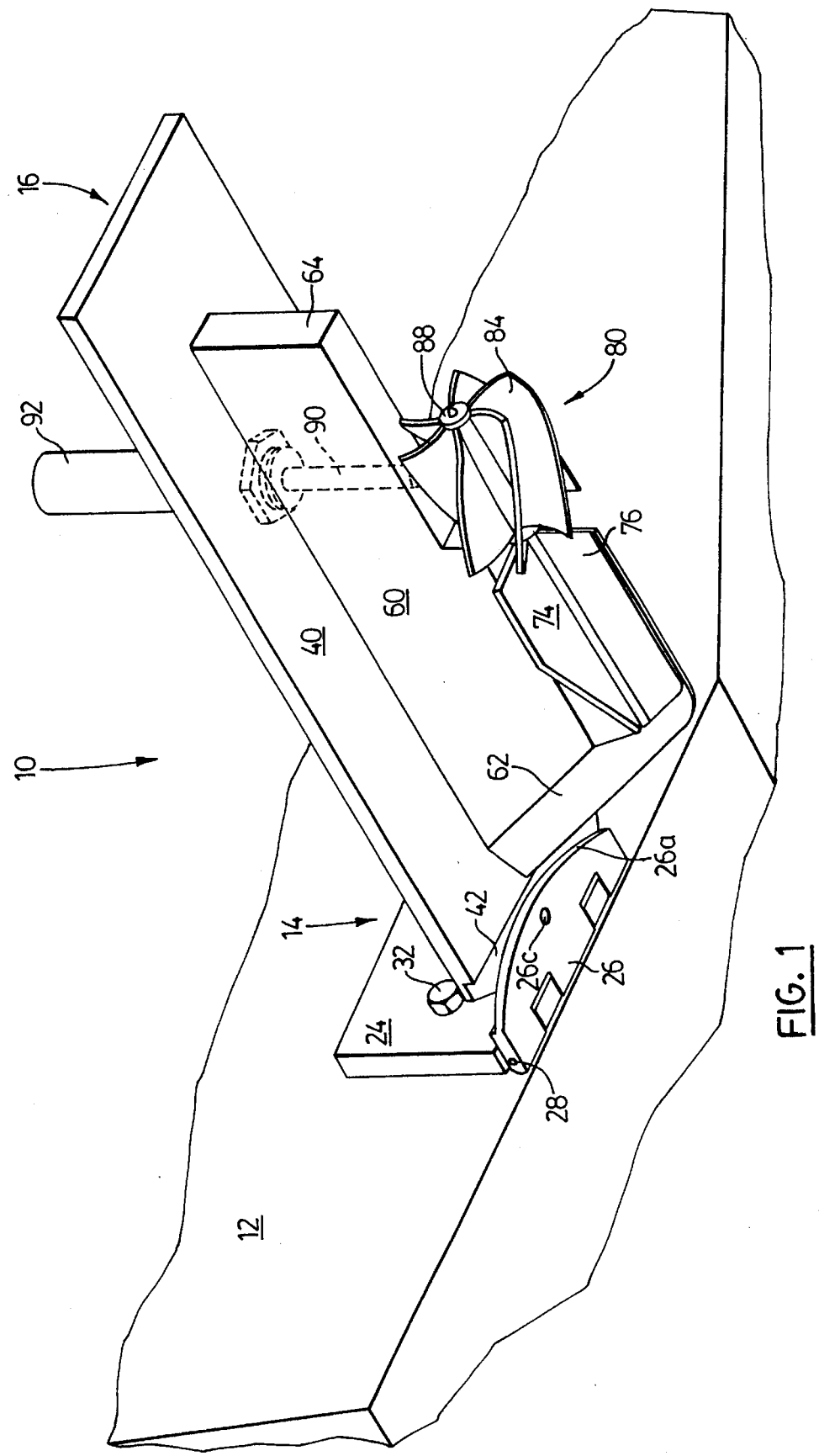
FIG. 1 is perspective view taken from the side and from below of a speed indicator mounted on the transom of a marine vehicle.
Figure 2:
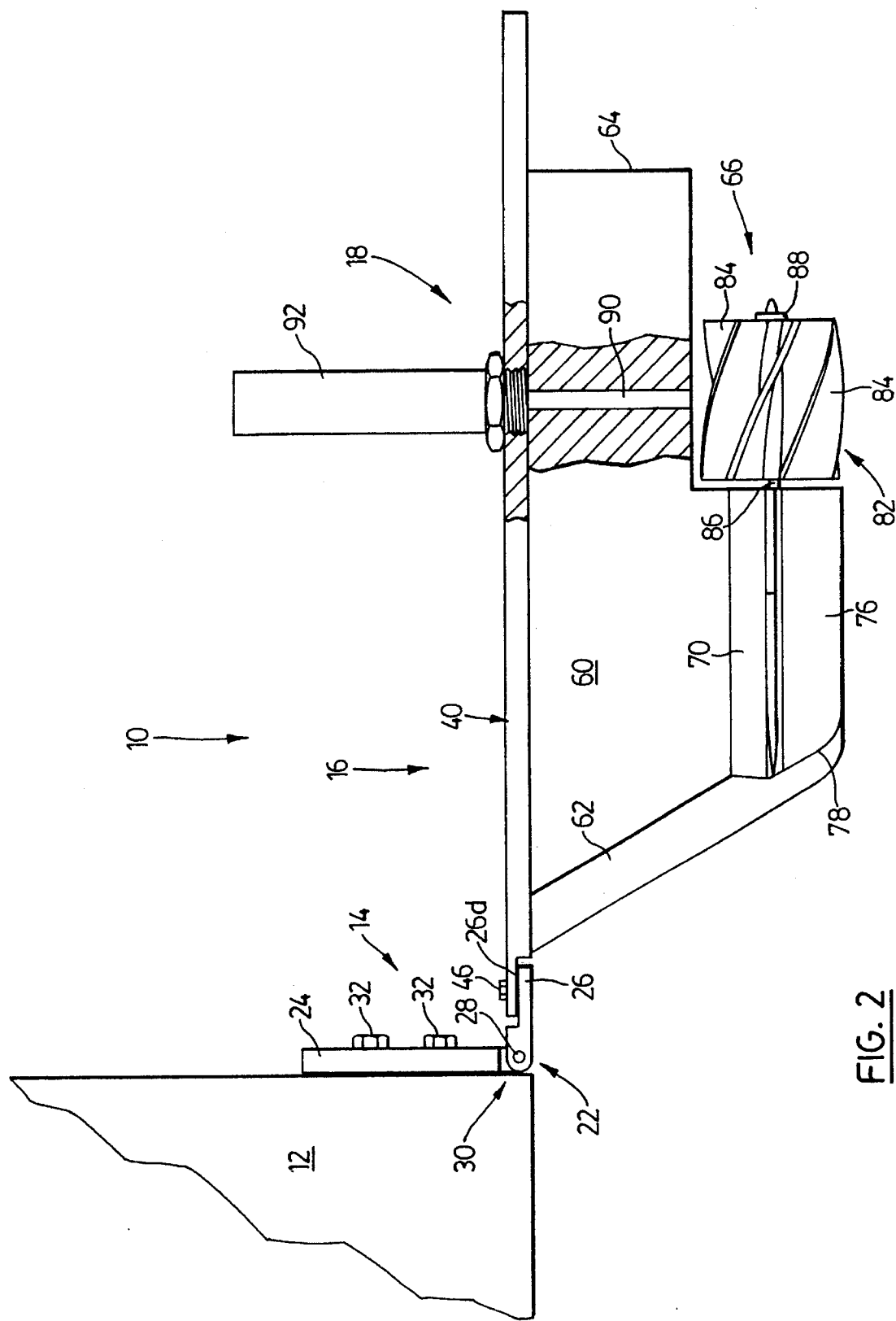
FIG. 2 is a side view partially in section of the speed indicator illustrated in FIG. 1.
Figure 3:
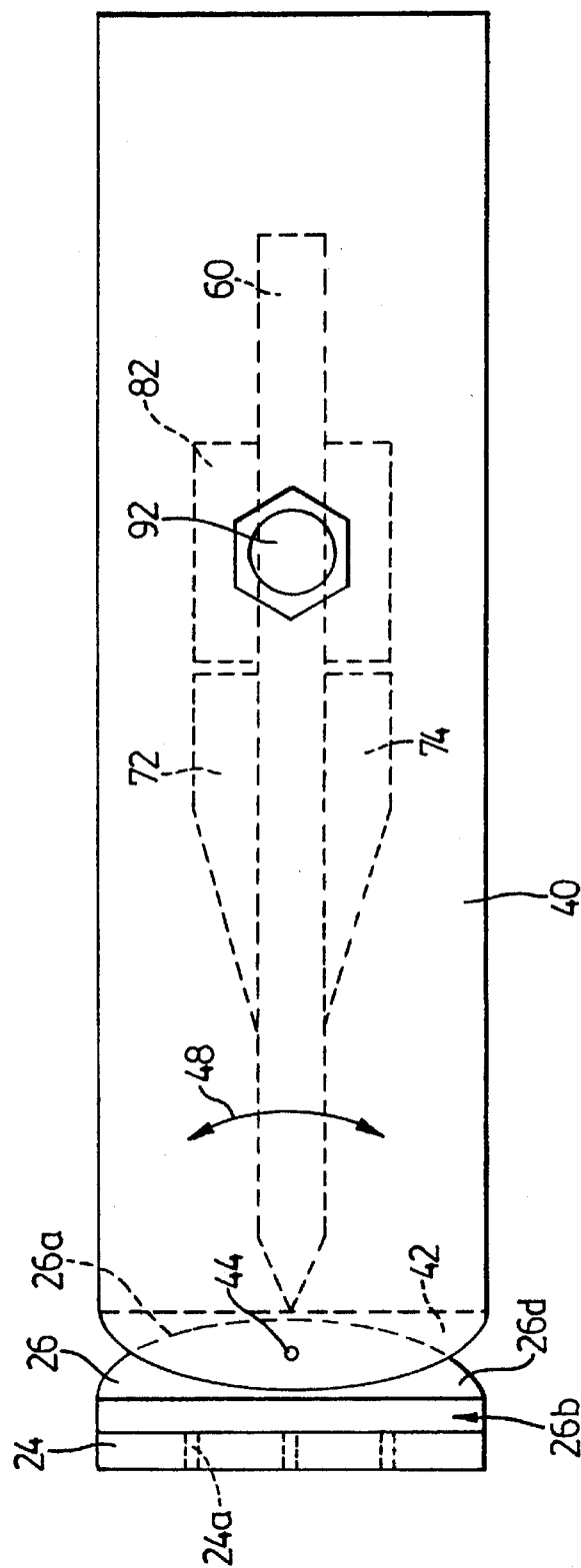
FIG. 3 is a top plan view of the speed indicator illustrated in FIG. 1 taken along arrow 2.

Referring now to FIGS. 1 to 4, a speed indicator for a marine vehicle is shown and is generally indicated by reference numeral 10. The speed indicator 10 is designed to be mounted on the lower transom area 12 of a marine vehicle in a manner so that the speed indicator is positioned generally in the same plane as the bottom of the marine vehicle and remains in line with the line of travel of the marine vehicle. The design of the speed indicator 10 is such that it provides accurate speed readings throughout a wide range of speeds as well as during cornering while avoiding plugging problems resulting from debris in the water, typically associated with conventional speed indicators. The speed indicator 10 will now be described more fully with specific reference to the FIG.

The speed indicator 10 includes a mount 14, a support 16 and a speed sensing arrangement 18. The mount 14 includes a bracket 22 in the form of a pair of plates 24 and 26 arranged at an angle with respect to one another. The two plates 24 and 26 are complimentary to one another at their proximal ends and are joined together by a releasable fastening pin 28 which passes through the ends of the two plates to form a lockable hinge 30.

Plate 24 is adapted to lie flat against the lower transom area 12 and has a plurality of spaced apertures 24a therein through which suitable fasteners 32 pass to secure the speed indicator 10 to the lower transom area 12. Plate 26 has a curved outer end 26a and a stepped upper surface 26b. A single aperture 26c is formed in the lower portion 26d of the stepped upper surface 26b.

The support 16 includes a mounting bracket 40 having a notched end 42 which overlies the lower portion 26d of the plate 26. The notched end 42 of the bracket 40 is also rounded and has an aperture 44 formed through it. Aperture 44 is in alignment with aperture 26c. A fastener 46 passes through the two apertures 44 and 26c respectively to secure the bracket 40 to the plate 26 while permitting relative movement between the bracket and the plate as indicated by arrow 48. The stepped upper surface 26b of the plate 26 and the notched end 42 of the bracket 40 are such that the higher portion of the stepped upper surface 26b is generally in the same plane as the upper surface of the bracket 40.

Depending from the bracket 40 is a guide vane 60 which tapers in thickness towards its side nearest the plate 26 to define a thin leading edge 62. The leading edge 62 of the guide vane 60 is rearwardly inclined so that the leading edge 62 forms an angle with an axis normal to the planar upper surface of the bracket 40. The opposite edge 64 of the guide vane 60 does not taper. A notch 66 is formed in the guide vane 60 adjacent its bottom rear corner to accommodate part of the speed sensing arrangement 18 as will be described.

Figure 4:
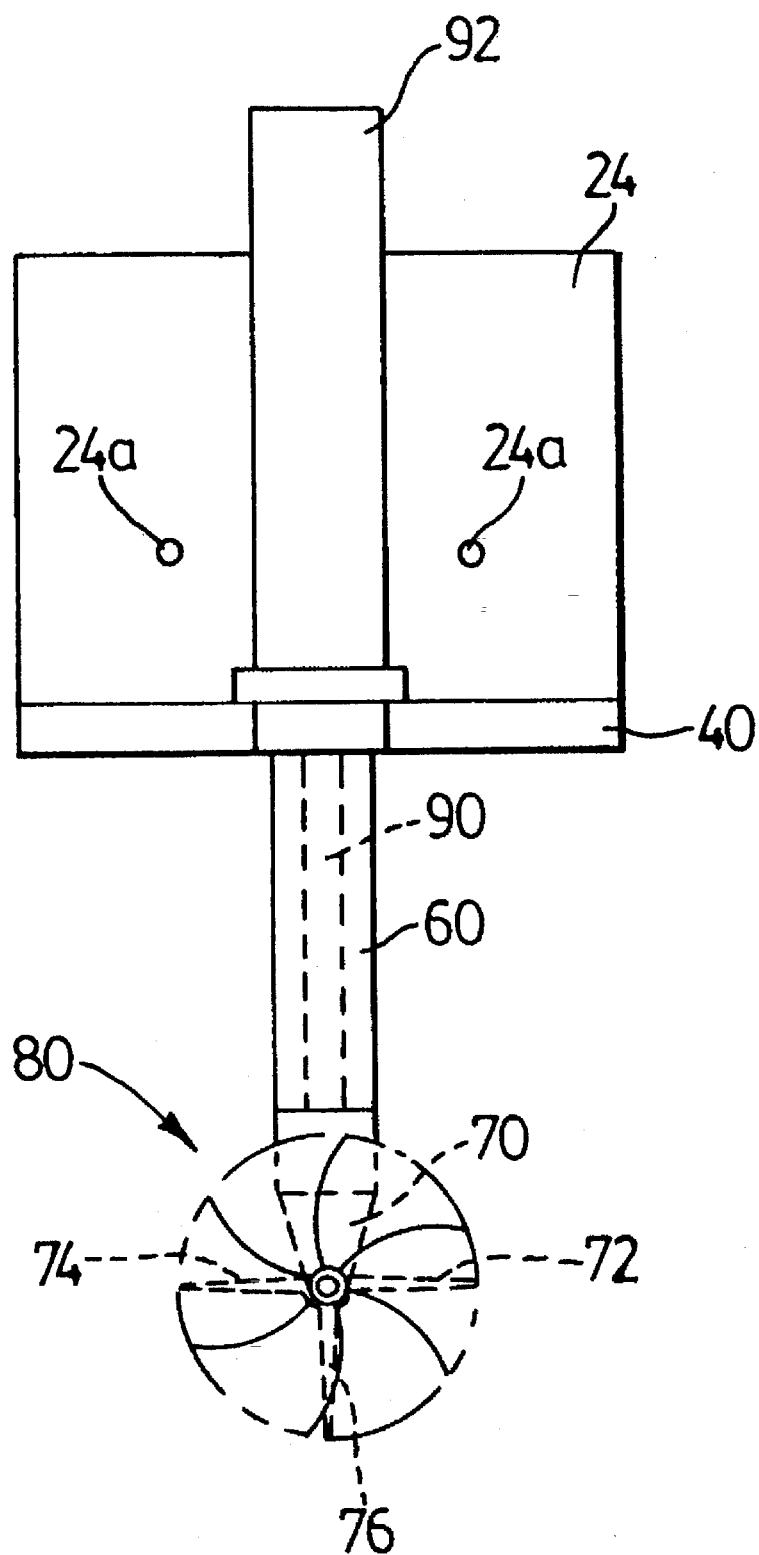

The portion 70 of the guide vane 60 in front of the notch 66 and behind the leading edge 62 tapers in thickness in a downward direction (best seen in FIG. 4). Three fins 72, 74 and 76 respectively extend from this portion of the guide vane 60. Two of the fins 72 and 74 are horizontal and extend outwardly from opposite sides of the guide vane. The outer edges of the fins 72 and 74 diverge in a direction away from the leading edge 62 part way along their lengths and then run parallel to each other for the remainder of their lengths. The third fin 76 extends downwardly from the guide vane 60 and has a leading edge 78 generally parallel to the leading edge 62 of the guide vane itself.

The speed sensing arrangement 18 includes an impeller 80 positioned within the notch 66 so that it does not project below the guide vane 60. The impeller 80 includes a rotor 82 having a number of vanes 84 about its circumference. The rotor 82 is formed of a magnetizable (e.g. magnetic conducting) material such as steel or cast iron and is rotatably mounted on a shaft 86 via a thrust bearing 88. The axis of the shaft 86 is generally parallel to the planar upper surface of the bracket 40 and extends into a passage formed in portion 70 of the guide vane 60.

A cylindrical magnetic conductor 90 is accommodated in a vertical passage form in the guide vane 60. The lower end of the magnetic conductor is exposed and is disposed above the rotor 82. A magnetic pick-up 92 such as that sold by Power Ignition Controls of Edmonton, Alberta under part number 32M183 is mounted on top of the bracket 40 above the magnetic conductor 90 in a manner so that the magnetic pick-up 92 detects changes in the magnetic flux in the magnetic conductor induced by the vanes 84 of the rotor 82 as they pass by the magnetic conductor.

Figure 5:
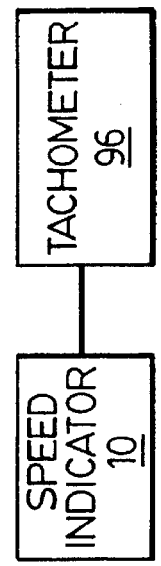
FIG. 5 is a schematic of the speed indicator illustrated in FIG. 1 in combination with a tachometer to provide a visual indication of the speed of a marine vehicle.

The magnetic pick-up 92 is electrically connected to a tachometer 96 (see FIG. 5) such as that made by Dynalco Controls under model number SPD100. The tachometer 96 uses the output of the magnetic pick-up and provides a visual indication of the speed of the marine vehicle relative to the water.

The operation of the speed indicator 10 will now be described. The speed indicator is mounted on the lower transom area 12 of a marine vehicle so that the bracket 40 is positioned at the water line and so that the impeller 80 is totally submerged. Depending on the type of marine vehicle or where on the transom of the marine vehicle, the speed indicator 10 is attached, the dimension of the guide vane 60 may vary, the reasons for which will be described.

Once the speed indicator has been mounted on the marine vehicle, if the axis of the shaft 86 and rotor 82 is not basically parallel to the plane of the bottom of the marine vehicle, the fastening pin 28 can be loosened to allow the plate 26 to be pivoted relative to the plate 24 via hinge 30 to bring the axis of the shaft 86 and rotor 82 parallel to the plane of the bottom of the marine vehicle. After this has been done, the fastening pin 28 can be tightened to prevent further relative movement between the two plates 24 and 26 respectively. Once this has been accomplished, the speed indicator 10 is considered to be positioned so that it functions optimally.

As the marine vehicle travels along the water, the impeller 80 is pulled through the water. The configuration of the vanes 84 on the rotor 82 is such to cause the impeller 80 to rotate at an angular velocity which is dependant on the speed of the marine vehicle relative to the water. As the impeller 80 rotates and the vanes 84 pass by the lower end of the magnetic conductor 90, changes in the magnetic flux are induced therein which are detected by the magnetic pick-up 92. The magnetic pick-up 92 in turn generates a voltage pulse every time a vane 84 of the rotor 82 passes beneath the magnetic conductor 90. The tachometer 96 receives the voltage pulses and converts them into a form suitable for driving its display so that a visual indication of the speed of the marine vehicle relative to the water is provided, To optimize operation, the magnetic strength of the magnetic pick-up 92 should be calibrated to deal with the length of the magnetic conductor 90 and the gap between the exposed end of the magnetic conductor 90 and the vanes 84 of the rotor 82. When the speed indicator 10 is mounted on large and/or low speed marine vehicles, the entire speed indicator 10 may be submerged. Therefore, the dimensions of the guide vane 60 and magnetic conductor 90 can be minimized which allows the magnetic strength of the magnetic pick-up to also be minimized. However, this arrangement is not satisfactory in all environments.

In the case of high speed marine vehicles, particularly those used in competitive water skiing, it is desired to support the magnetic pick-up 92 above the water level. In this application, the dimension of the guide vane 60 should be such to ensure that the impeller 80 is totally submerged with the magnetic pick-up 92 being supported above the water level. This inhibits the magnetic pick-up 92 from creating a "rooster tail" as the marine vehicle travels. In this arrangement, the magnetic strength of magnetic pick-up becomes more critical to ensure accurate detection of the vanes 84 of the rotor 82 as the rotor rotates.

The pivotal connection of the plate 26 and the mounting bracket 40 together with the guide vane 60 allows the axis of the impeller 80 to remain generally in line with the direction of travel of the marine vehicle. This permits the speed indicator 10 to provide accurate speed readings over the entire speed range of the marine vehicle including very low speeds and during cornering. Also, the guide vane 60 and fins 72 to 76 provide for laminar flow across the rotor 82 which enhances accuracy and stability of the speed indicator 10 throughout the entire speed range of the marine vehicle.

Because the rotor 82 of the impeller is not enclosed within a housing, the likelihood of debris in the water impeding the operation of the speed sensing arrangement 18 is greatly reduced as compared to prior art speed indicators. Although debris may cause a slight "bump" in the speed reading, the speed indicator 10 will provide a normal reading as soon as the debris has passed. Also, this design allows the rotor 82 to be removed from the shaft 86 for repair or replacement with ease.

Depending on the accuracy of the speed reading that is required, the rotor design may vary. For more accurate readings, it is desired to use a rotor which rotates at a greater angular velocity for a given marine vehicle speed. This of course can be accomplished by changing the pitch of the vanes 84 on the rotor 82.

In addition, the speed indicator 10 provides advantages in that the rotor 82 does not need to carry magnetics provided it is formed of magnetizable material. This reduces manufacturing costs as compared to speed indicators which require permanent magnets to be incorporated into the vanes of the impeller. Also, because the magnetic pick-up generates a voltage upon detection of the magnetic fluxes induced in the magnetic conductor 90 by the rotor vanes 84, the induced voltages can be used to drive the tachometer 96, eliminating the need for an external lower supply.

It should be apparent to those of skill in the art that various modifications and variations may be made to the present invention without departing from the scope thereof as defined by the appended claims.

We claim:

1. A speed indicator for a marine vehicle comprising:

mounting means to secure said indicator to said marine vehicle;

an impeller including vanes of magnetically conducting material and being rotatably mounted on said indicator, said impeller rotating at an angular velocity dependent on the speed of said marine vehicle;

magnetic sensing means to sense rotation of said impeller and provide an output representative of the speed of said marine vehicle; and a support on which said impeller and magnetic sensing means are mounted, said support being pivotal relative to said mounting means about an axis generally normal to the axis of said impeller.

2. A speed indicator as defined in claim 1 wherein said magnetic sensing means includes a magnetic conductor disposed above said impeller and a magnetic pick-up associated with said magnetic conductor, said magnetic pick-up creating magnetic flux in said magnetic conductor and detecting changes in said magnetic flux induced by successive passes of said vanes of said impeller, said magnetic pick-up generating said output in response to said changes in said magnetic fluxes.

3. A speed indicator as defined in claim 2 wherein said support further includes guide means to assist pivoting of said support about said axis so that the axis of said impeller remains substantially parallel with the direction of travel of said marine vehicle.

4. A speed indicator as defined in claim 3 wherein said guide means inhibits turbulent flow of water across said impeller.

5. A speed indicator as defined in claim 4 wherein said guide means is in the form a guide vane, said guide vane including a number of fins extending from said guide vane upstream of said impeller.

6. A speed indicator as defined in claim 5 wherein said guide vane includes three fins extending from said guide vane, two of said fins being located on opposite sides of said guide vane and extending generally normal to said guide vane and the third fin extending downwardly from and generally in the same plane as said guide vane.

7. A speed indicator as defined in claim 1 wherein said mounting means permits the axis of said impeller to be positioned generally parallel to the plane of the bottom of said marine vehicle.

8. A speed indicator as defined in claim 7 wherein said mounting means includes a lockable hinge to permit the axis of said impeller to be positioned generally parallel to the plane of the bottom of said marine vehicle.

9. A speed indicator as defined in claim 1 wherein said support positions said magnetic pick-up above the water level while totally submerging said impeller.

10. A speed indicator as defined in claim 9 wherein said support includes a generally planar bracket on which said magnetic pick-up is mounted and a guide vane depending from said bracket, said impeller being mounted on said guide vane downstream of the leading edge thereof.

11. A speed indicator as defined in claim 10 wherein said bracket is pivotally mounted on said mounting means.

12. A speed indicator as defined in claim 11 wherein said guide vane includes a number of fins extending from said guide vane upstream of said impeller.

13. A speed indicator as defined in claim 12 wherein said guide vane includes three fins extending from said guide vane, two of said fins being located on opposite sides of said guide vane and extending generally normal to said guide vane and the third fin extending downwardly from and generally in the same plane as said guide vane.

14. A speed indicator for a marine vehicle comprising:

mounting means to secure said indicator to said marine vehicle;

an impeller rotatably mounted on said indicator and rotating at an angular velocity dependent on the speed of said marine vehicle, said indicator being pivotal relative to said mounting means about an axis generally normal to the axis of said marine vehicle said indicator being pivotal relative to said mounting means about an axis generally normal to the axis of said impeller; and sensing means to sense rotation of said impeller and provide an output representative of the speed of said marine vehicle, wherein said mounting means is selectively adjustable to allow the axis of said impeller to be positioned generally parallel to the plane of the bottom of said marine vehicle.

15. A speed indicator as defined in claim 14 wherein said mounting means includes a lockable hinge to permit said selectively adjustable positioning of the axis of said impeller generally parallel to the plane of the bottom of said marine vehicle.

16. A speed indicator for a marine vehicle comprising:

mounting means to secure said indicator to said marine vehicle;

an impeller rotatably mounted on said indicator and rotating at an angular velocity dependant on the speed of said marine vehicle;

sensing means to sense rotation of said impeller and provide an output representative of the speed of said marine vehicle; and a support for said impeller and said sensing means, said support being pivotal relative to the mounting means about an axis generally normal to the axis of said impeller; and including guide means to assist pivoting of said support about said axis so that the axis of said impeller remains substantially in line with the direction of travel of said marine vehicle.

17. A speed indicator as defined in claim 16 wherein said guide means is configured to inhibit turbulent flow of water across said impeller.

18. A speed indicator as defined in claim 17 wherein said guide means is in the form a guide vane, said guide vane including a number of fins extending from said guide vane upstream of said impeller.

19. A speed indicator for marine vehicles comprising:

mounting means to secure said speed indicator to said marine vehicle;

an impeller rotatably mounted on said indicator and rotating at an angular velocity dependant on the speed of said marine vehicle;

sensing means to sense rotation of said impeller and provide an output representative of the speed of said marine vehicle; and means to inhibit turbulent flow across said impeller comprising a guide vane upstream of said impeller.

20. A speed indicator as defined in claim 19 wherein said guide vane includes a number of fins extending from said guide vane.

21. A speed indicator as defined in claim 20 wherein said guide vane includes three fins extending from said guide vane, two of said fins being located on opposite sides of said guide vane and extending generally normal to said guide vane and the third fin extending downwardly from and generally in the same plane as said guide vane.

* * * * *

UNITED STATES PATENT AND TRADEMARK OFFICE
CERTIFICATE OF CORRECTION

PATENT NO. : 5,483,828
DATED : January 16, 1996
INVENTOR(S) : Brian Callihoo

It is certified that error appears in the above-indentified patent and that said Letters Patent is hereby corrected as shown below:

Claim 14, column 7, lines 31-33, delete "marine vehicle said indicator being pivotal relative to said mounting means about an axis generally normal to the axis of said".

Signed and Sealed this

Ninth Day of April, 1996

Attest:

BRUCE LEHMAN

Attesting Officer     Commissioner of Patents and Trademarks